United States Patent [19]
Toyoshima et al.

[11] Patent Number: 6,143,832
[45] Date of Patent: Nov. 7, 2000

[54] AROMATIC VINYL-CONJUGATED DIENE BLOCK COPOLYMER AND PRODUCTION PROCESS THEREOF

[75] Inventors: Tetsuya Toyoshima; Hiroaki Matsuda, both of Kanagawa, Japan

[73] Assignee: Nippon Zeon Co., Ltd., Tokyo, Japan

[21] Appl. No.: 09/082,332

[22] Filed: May 21, 1998

[30] Foreign Application Priority Data

May 22, 1997 [JP] Japan ..................................... 9-150313

[51] Int. Cl.$^7$ .................................................. C08F 297/04
[52] U.S. Cl. ......................... 525/314; 525/241; 525/242; 525/315; 525/316
[58] Field of Search .................... 525/314, 242, 525/241, 315, 316

[56] References Cited

U.S. PATENT DOCUMENTS

| | | | |
|---|---|---|---|
| 5,180,780 | 1/1993 | Nakamura et al. | 525/96 |
| 5,231,142 | 7/1993 | Tsubokura et al. | 525/316 |
| 5,438,103 | 8/1995 | DePorter et al. | 525/314 |
| 5,470,915 | 11/1995 | Cha et al. | 525/314 |
| 5,777,039 | 7/1998 | De Craene et al. | 525/314 |
| 5,861,455 | 1/1999 | Reddy et al. | 524/504 |

FOREIGN PATENT DOCUMENTS

| | | |
|---|---|---|
| 63-64444 | 12/1988 | Japan . |
| 64-74209 | 3/1989 | Japan . |
| 2-185509 | 7/1990 | Japan . |
| WO9625442 | 8/1996 | WIPO . |

OTHER PUBLICATIONS

Kohlthoff et al, *Journal of Polymer Science*, vol. 1, No. 5 (1946).

Patent Abstracts of Japan, vol. 013, No. 278 (C–611), Jun. 26, 1989 (based on JP 01–074209A dated Mar. 20, 1989).

European Search Report for EP 98 30 4112 dated Sep. 14, 1998.

*Primary Examiner*—P. Hampton-Hightower
*Attorney, Agent, or Firm*—Dinsmore & Shohl LLP

[57] ABSTRACT

Disclosed herein are an aromatic vinyl-conjugated diene block copolymer composed of a bound aromatic vinyl unit and a bound conjugated diene unit and containing at least a block aromatic vinyl segment, wherein:

(1) a content of the bound aromatic vinyl unit in the block copolymer is 5 to 60 wt. %;

(2) a molecular weight (A-Mp) corresponding to a peak in a molecular weight distribution curve of the block aromatic vinyl segment (A) as determined by gel permeation chromatography (GPC) is 80,000 to 300,000;

(3) a proportion of block aromatic vinyl segment portions having a molecular weight at most a third of the molecular weight (A-Mp) corresponding to the peak in the molecular weight distribution curve of the block aromatic vinyl segment (A) by GPC is 30 to 90 mol % based on the total content of the block aromatic vinyl segment (A); and (4) a molecular weight (Mp) corresponding to a peak in a molecular weight distribution curve of the block copolymer as determined by GPC is 10,000 to 1,000,000, a production process thereof, a resin composition comprising the block copolymer, and a preparation process of the resin composition.

16 Claims, No Drawings

AROMATIC VINYL-CONJUGATED DIENE BLOCK COPOLYMER AND PRODUCTION PROCESS THEREOF

FIELD OF THE INVENTION

The present invention relates to an aromatic vinyl-conjugated diene block copolymer which has excellent bale-forming property and can provide a resin composition having excellent impact resistance without impairing the transparency of its resin component when the block copolymer is used as an elastic polymer component for high-impact resin, and a production process thereof. The present invention also relates to a resin-modifying agent comprising the aromatic vinyl-conjugated diene block copolymer as an active ingredient, a resin composition comprising such a modifying agent, and a preparation process of the resin composition.

BACKGROUND OF THE INVENTION

High-impact poly(aromatic vinyl) resins such as high-impact polystyrene (HIPS) and ABS resins (acrylonitrile-butadiene-styrene resins) are polymer alloys generally obtained by blending or grafting an elastic polymer such as a conjugated diene copolymer with or on a poly(aromatic vinyl) resin to improve the impact resistance of the poly (aromatic vinyl) resin. Such a polymer alloy has a structure that the elastic polymer is finely dispersed in a matrix of the poly(aromatic vinyl) resin, which is rigid and brittle in itself, and is rigid and excellent in impact resistance.

High-impact poly(aromatic vinyl) resins obtained by using an aromatic vinyl-conjugated diene block copolymer as an elastic polymer have heretofore been known. The high-impact poly(aromatic vinyl) resins are generally produced by polymerizing an aromatic vinyl monomer or a mixture of the aromatic vinyl monomer and another monomer copolymerizable with the aromatic vinyl monomer in the presence of an aromatic vinyl-conjugated diene block copolymer. As polymerization processes thereof, are used bulk polymerization, solution polymerization, bulk-suspension polymerization and the like.

In recent years, the high-impact poly(aromatic vinyl) resins have been widely used as housing materials for electric appliances such as televisions and air conditioners. With the progress of size-enlarging and weight-reducing technology in these housing materials, there is a strong demand for materials having the ability to form a thin wall. It is thus desired that the high-impact poly(aromatic vinyl) resins be still more improved in impact resistance.

In order to improve the impact resistance of the high-impact poly(aromatic vinyl) resins, some proposals have heretofore been made. For example, Japanese Patent application Laid-Open No. 185509/1990 discloses a method in which an aromatic vinyl-conjugated diene block copolymer having a low vinyl bond content in a conjugated diene segment is used as an elastic polymer component. However, this method is yet insufficient in improving effect on impact resistance.

In addition, this aromatic vinyl-conjugated diene block copolymer involves a problem of poor bale-forming property upon production. The bale originally means a product obtained by drying raw rubber in the form of sheet, stacking and pressing sheets into about 50-cm cubes and dusting the outsides thereof so as not to stick to each other, and is a form of product used for long in natural rubber. Synthetic rubber also is often formed into a pressed product by compression-molding the resultant synthetic rubber after a polymerization step. The pressed product is required to be firmly formed and not to easily get out of shape upon handling. In the case of synthetic rubber poor in bale-forming property, it is impossible to obtain a pressed product by compression molding, or the resulting pressed product is taken in rubber pieces by rubbing the surface of the pressed product with fingers or easily get out of shape by disintegrating it with fingers. Accordingly, rubber is required to have excellent bale-forming property from the viewpoints of productivity, form of product and handling.

In order to improve the impact resistance, it has also been known to increase the molecular weight of an aromatic vinyl-conjugated diene block copolymer. However, the aromatic vinyl-conjugated diene block copolymer obtained by this method involves a problem of poor bale-forming property upon production.

Japanese Patent Application Laid-Open No. 74209/1989 discloses an aromatic vinyl-conjugated diene block copolymer in which a molecular weight (A-Mp) corresponding to a peak in a molecular weight distribution curve of a block aromatic vinyl segment (A) as determined by gel permeation chromatography (GPC) is from 30,000 to 75,000, and a proportion of block aromatic vinyl segment portions having a molecular weight at most a third of the molecular weight (A-Mp) corresponding to the peak in the molecular weight distribution curve of the block aromatic vinyl segment (A) is 25 to 50 mol %. This document describes the aromatic vinyl-conjugated diene block copolymer as being excellent in bale-forming property. However, the aromatic vinyl-conjugated diene block copolymer has involved a problem that when the block copolymer is used as an elastic polymer component for high-impact poly(aromatic vinyl) resin, the transparency of the resin component is impaired.

OBJECTS AND SUMMARY OF THE INVENTION

It is an object of the present invention to provide an aromatic vinyl-conjugated diene block copolymer which has excellent bale-forming property and can provide a resin composition having excellent impact resistance without impairing the transparency of its resin component when the block copolymer is used as an elastic polymer component for high-impact resin, and a production process thereof.

Another object of the present invention is to provide a resin-modifying agent which can fully improve the impact resistance of a high-impact resin without impairing the transparency of the resin when the agent is used as an elastic polymer component for the high-impact resin, a resin composition well balanced between impact resistance and transparency, and a preparation process of the resin composition.

The present inventors have carried out an extensive investigation with a view toward solving the above-described problems involved in the prior art. As a result, it has been found that the above objects can be achieved by an aromatic vinyl-conjugated diene block copolymer which has a specific content of a bound aromatic vinyl unit, is high in molecular weight (A-Mp) corresponding to a peak (hereinafter referred to as "peak top molecular weight") in a molecular weight distribution curve of a block aromatic vinyl segment (A) and high in proportion of block aromatic vinyl segment portions having a molecular weight at most a third of the peak top molecular weight (A-Mp) of the block aromatic vinyl segment (A), and has a molecular weight within a specific range.

The aromatic vinyl-conjugated diene block copolymer according to the present invention has excellent bale-forming property and can provide a resin composition well balanced between impact resistance and transparency when the block copolymer is contained as an elastic polymer component in a thermoplastic resin such as a poly(aromatic vinyl) resin. The aromatic vinyl-conjugated diene block copolymer according to the present invention can be produced with ease by a process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of polymerizing a mixture composed of the aromatic vinyl monomer and the conjugated diene monomer and polymerizing the aromatic vinyl monomer. The above-described resin composition can also be obtained with ease by radical-polymerizing an aromatic vinyl monomer or a mixture of the aromatic vinyl monomer and another monomer copolymerizable with the aromatic vinyl monomer in the presence of the aromatic vinyl-conjugated diene block copolymer.

The present invention has been led to completion on the basis of these findings.

According to the present invention, there are thus provided the following:

1. An aromatic vinyl-conjugated diene block copolymer composed of a bound aromatic vinyl unit and a bound conjugated diene unit and containing at least a block aromatic vinyl segment, wherein:
   (1) a content of the bound aromatic vinyl unit in the block copolymer is 5 to 60 wt. %;
   (2) a peak top molecular weight (A-Mp) in a molecular weight distribution curve of the block aromatic vinyl segment (A) as determined by gel permeation chromatography (GPC) is 80,000 to 300,000;
   (3) a proportion of block aromatic vinyl segment portions having a molecular weight at most a third of the peak top molecular weight (A-Mp) in the molecular weight distribution curve of the block aromatic vinyl segment (A) by GPC is 30 to 90 mol % based on the total content of the block aromatic vinyl segment (A); and
   (4) a peak top molecular weight (Mp) in a molecular weight distribution curve of the block copolymer as determined by GPC is 10,000 to 1,000,000.

2. A process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of polymerizing a mixture composed of the aromatic vinyl monomer and the conjugated diene monomer and polymerizing the aromatic vinyl monomer.

3. A resin-modifying agent comprising the above-described aromatic vinyl-conjugated diene block copolymer as an active ingredient.

4. A resin composition comprising a resin component and a rubber component, wherein the rubber component contains the above-described aromatic vinyl-conjugated diene block copolymer.

5. A process for preparing a resin composition by radical-polymerizing an aromatic vinyl monomer or a mixture of the aromatic vinyl monomer and another monomer copolymerizable with the aromatic vinyl monomer in the presence of a rubber component, which comprises using, as the rubber component, a rubber component containing the above-described aromatic vinyl-conjugated diene block copolymer.

DETAILED DESCRIPTION OF THE INVENTION

Aromatic Vinyl-coniuqated Diene Block Copolymer

The aromatic vinyl-conjugated diene block copolymer according to the present invention is a block copolymer composed of a bound aromatic vinyl unit and a bound conjugated diene unit and containing at least a block aromatic vinyl segment. The block copolymer can be obtained by copolymerizing an aromatic vinyl monomer and a conjugated diene monomer.

No particular limitation is imposed on the aromatic vinyl monomer. As examples thereof, may be mentioned styrene, $\alpha$-methylstyrene, 2-methylstyrene, 3-methyl-styrene, 4-methylstyrene, 2,4-diisopropylstyrene, 2,4-dimethylstyrene, 4-t-butylstyrene, 5-t-butyl-2-methyl-styrene, monochlorostyrene, dichlorostyrene and monofluorostyrene. Of these, styrene is preferred. These aromatic vinyl monomers may be used either singly or in any combination thereof.

No particular limitation is imposed on the conjugated diene monomer, and examples thereof include 1,3-butadiene, 2-methyl-1,3-butadiene (i.e., isoprene), 2,3-dimethyl-1,3-butadiene, 2-chloro-1,3-butadiene and 1,3-pentadiene. Of these, 1,3-butadiene and 2-methyl-1,3-butadiene are preferred, with 1,3-butadiene being particularly preferred. These conjugated diene monomers may be used either singly or in any combination thereof.

With respect to proportions of the individual components in the aromatic vinyl-conjugated diene block copolymer according to the present invention, the content of the bound aromatic vinyl unit is within a range of from 5 to 60 wt. %, preferably from 10 to 55 wt. %, more preferably from 20 to 50 wt. %, most preferably from 25 to 50 wt. %, while the content of the bound conjugated diene unit is within a range of from 40 to 95 wt. %, preferably from 45 to 90 wt. %, more preferably from 50 to 80 wt. %, most preferably from 50 to 75 wt. %. If the content of the bound aromatic vinyl unit in the aromatic vinyl-conjugated diene block copolymer is too low, the transparency of a resin composition containing such a block copolymer is deteriorated. If the proportion is too high on the other hand, such a block copolymer has poor bale-forming property and little improving effect on impact resistance. It is hence not preferable to contain the bound aromatic vinyl in such a too low or high proportion.

The proportion of the block aromatic vinyl segment (i.e., aromatic vinyl polymer block) (A) in the aromatic vinyl-conjugated diene block copolymer according to the present invention is generally at least 30 wt. %, preferably 40 to 95 wt. %, more preferably 50 to 90 wt. % based on the total content of the bound aromatic vinyl unit. It is preferable that the proportion of the block aromatic vinyl segment (A) in the aromatic vinyl-conjugated diene block copolymer should fall within this range, since such a block copolymer has excellent bale-forming property, and its improving effects on impact resistance and transparency are well balanced.

In the present invention, the content of the block aromatic vinyl segment (A) in the aromatic vinyl-conjugated diene block copolymer can be determined in accordance with a method known per se in the art. More specifically, the content is determined as that separated by filtration through a glass filter having an average pore size of 5.0 $\mu$m after oxidatively decomposing the aromatic vinyl-conjugated diene block copolymer with tert-butyl hydroperoxide using a catalytic amount of osmic acid in accordance with the decomposition method with osmic acid described in I. M. Kolthoff et al., J. Polym. Sci., 1, 429 (1946).

The peak top molecular weight (A-Mp) in the molecular weight distribution curve of the block aromatic vinyl segment (A) in the aromatic vinyl-conjugated diene block copolymer according to the present invention is a value determined in terms of the molecular weight of polystyrene by gel permeation chromatography (GPC) and is within a range of from 80,000 to 300,000, preferably from 80,000 to 200,000, more preferably from 85,000 to 170,000. If the peak top molecular weight (A-Mp) in the molecular weight distribution curve of the block aromatic vinyl segment (A) is too low, the transparency of a resin composition containing such a block copolymer is deteriorated. If the peak top molecular weight is too high on the other hand, such a block copolymer has little improving effect on impact resistance. Both too low and too high peak top molecular weights are hence not preferable.

The proportion of block aromatic vinyl segment portions having a molecular weight at most a third of the peak top molecular weight (A-Mp) in the molecular weight distribution curve of the block aromatic vinyl segment (A) in the aromatic vinyl-conjugated diene block copolymer according to the present invention is within a range of from 30 to 90 mol %, preferably from 50 to 80 mol %, more preferably from 55 to 70 mol %, based on the total content of the block aromatic vinyl segment (A). If the proportion of the block aromatic vinyl segment portions having a molecular weight at most a third of the peak top molecular weight (A-Mp) in the molecular weight distribution curve of the block aromatic vinyl segment (A) in the aromatic vinyl-conjugated diene block copolymer is too low, the improving effects of such a block copolymer on impact resistance and transparency become poor, to say nothing of its poor bale-forming property. On the other hand, it is difficult to produce any block copolymer containing the block aromatic vinyl segment portions in a too high proportion.

No particular limitation is imposed on the microstructure of the conjugated diene segment in the aromatic vinyl-conjugated diene block copolymer according to the present invention. However, it is preferable that the content of vinyl bond (1,2-vinyl bond and 3,4-vinyl bond) be generally at most 50%, preferably at most 40%, more preferably at most 30%, most preferably at most 20%, since the improving effect of such a block copolymer on impact resistance becomes high.

The peak top molecular weight (Mp) in the molecular weight distribution curve of the aromatic vinyl-conjugated diene block copolymer according to the present invention is within a range of from 10,000 to 1,000,000, preferably from 50,000 to 800,000, more preferably from 100,000 to 600,000 as determined in terms of polystyrene by GPC. If the peak top molecular weight (Mp) of the aromatic vinyl-conjugated diene block copolymer is too low, its improving effect on impact resistance becomes poor. If the peak top molecular weight (Mp) is too high on the other hand, the solution viscosity of the block copolymer becomes increased, and so a problem is offered from the viewpoint of a production process of the block copolymer.

No particular limitation is imposed on a production process of the aromatic vinyl-conjugated diene block copolymer according to the present invention. However, as a preferable example thereof, may be mentioned a process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of (a) polymerizing a mixture composed of the aromatic vinyl monomer and the conjugated diene monomer and (b) polymerizing the aromatic vinyl monomer.

No particular limitation is imposed on the hydrocarbon solvent, and examples of usable solvents include aliphatic hydrocarbons such as butane, pentane and hexane; alicyclic hydrocarbons such as cyclopentane and cyclohexane; and aromatic hydrocarbons such as benzene, toluene and xylene. These hydrocarbon solvents may be used either singly or in any combination thereof.

Examples of the active organometallic compound include active organometallic compounds which permit anionic polymerization, such as organic alkali metal compounds, organic alkaline earth metal compounds and organic rare earth metal compounds of the lanthanoid series. Of these, the organic alkali metal compounds are particularly preferred from the viewpoints of polymerization reactivity and economy.

Examples of the organic alkali metal compounds include organic monolithium compounds such as n-butyllithium, sec-butyllithium, t-butyllithium, hexyllithium, phenyllithium and stilbene lithium; polyfunctional organolithium compounds such as dilithiomethane, 1,4-dilithiobutane, 1,4-dilithio-2-ethylcyclohexane and 1,3,5-trilithiobenzene; and sodium naphthalene and potassium naphthalene. Of these, the organolithium compounds are preferred, with the organic monolithium compounds being particularly preferred.

Examples of the organic alkaline earth metal compounds include n-butylmagnesium bromide, n-hexyl-magnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

Examples of the organic rare earth metal compounds of the lanthanoid series include composite catalysts composed of neodymium versate/triethylaluminum hydride/ethylaluminum sesquichloride as described in Japanese Patent Publication No. 64444/1988.

These active organometallic compounds may be used either singly or in any combination thereof. The amount of the active organometallic compound used is suitably selected according to a molecular weight required of a polymer formed. However, it is generally within a range of from 0.01 to 20 millimoles, preferably from 0.05 to 15 millimoles, more preferably from 0.1 to 10 millimoles per 100 g of the whole monomer used.

In the production process according to the present invention, the aromatic vinyl monomer in a proportion of from 5 to 60 wt. %, preferably from 10 to 55 wt. %, more preferably from 20 to 50 wt. %, most preferably from 25 to 50 wt. % is copolymerized with the conjugated diene monomer in a proportion of from 40 to 95 wt. %, preferably from 45 to 90 wt. %, more preferably from 50 to 80 wt. %, most preferably from 50 to 75 wt. %. The step (a) of polymerizing a monomer mixture composed of the aromatic vinyl monomer and the conjugated diene monomer is provided in the production process according to the present invention, whereby the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be increased.

A proportion of the aromatic vinyl monomer to the conjugated diene monomer in the monomer mixture is generally within a range of from 10:90 to 90:10, preferably from 20:80 to 80:20, more preferably from 30:70 to 70:30 in terms of a weight ratio of [aromatic vinyl]:[conjugated diene]. When the proportion of the aromatic vinyl monomer to the conjugated diene monomer in the monomer mixture falls within this range, the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be highly enhanced, so that the block copolymer can be provided as a block copolymer having excellent bale-forming property and also improving effects on impact resistance and transparency.

A proportion of the monomer mixture in all the monomers used may be suitably selected according to the proportion of the block aromatic vinyl segment portions having a molecular weight at most a third of the peak top molecular weight (A-Mp) in the molecular weight distribution curve of the block aromatic vinyl segment (A) required of the resulting aromatic vinyl-conjugated diene block copolymer. However, it is generally within a range of from 10 to 90 wt. %, preferably from 15 to 70 wt. %, more preferably from 20 to 50 wt. %.

A step (c) of polymerizing the conjugated diene monomer is provided prior to the step (a) of polymerizing the monomer mixture in the production process according to the present invention, whereby the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be more increased. No particular limitation is imposed on a proportion of the conjugated diene polymerized prior to the step of polymerizing the monomer mixture to the monomer mixture. However, it is generally within a range of from 20:80 to 90:10, preferably from 40:60 to 80:20, more preferably from 50:50 to 70:30 in terms of a weight ratio of [conjugated diene]/[monomer mixture]. A proportion of the conjugated diene to the monomer mixture falling within this range is preferred in that the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be highly enhanced.

In the production process according to the present invention, the step (b) of polymerizing the aromatic vinyl monomer is necessary. Unless the step (b) of polymerizing the aromatic vinyl monomer is provided, any block copolymer containing a block aromatic vinyl segment (A) having a satisfactory peak top molecular weight (A-Mp) in the molecular weight distribution curve thereof cannot be obtained, so that the resulting block copolymer has a poor transparency-improving effect and is hence not preferred.

A proportion of the aromatic vinyl monomer in the step (b) of polymerizing the aromatic vinyl monomer to all the monomers used may be suitably selected according to the peak top molecular weight (A-Mp) in the molecular weight distribution curve of the block aromatic vinyl segment (A) required of the resulting aromatic vinyl-conjugated diene block copolymer. However, it is preferable that the proportion be generally within a range of from 10:90 to 90:10, preferably from 20:80 to 80:20, more preferably from 30:70 to 70:30 in terms of a weight ratio of [amount of the aromatic vinyl in the monomer mixture]:[amount of the aromatic vinyl in the step of polymerizing the aromatic vinyl], since the peak top molecular weight (A-Mp) in the molecular weight distribution curve of the block aromatic vinyl segment (A) and the proportion of the block aromatic vinyl segment portions having a molecular weight at most a third of the peak top molecular weight (A-Mp) in the molecular weight distribution curve of the block aromatic vinyl segment (A) are well balanced to each other. The production process of the block copolymer according to the present invention may be conducted by suitably combining plural steps such as with one another. However, particularly preferred is a process in which the polymerization is conducted in the order of the step (c) of polymerizing the conjugated diene monomer, the step (a) of polymerizing the monomer mixture and the step (b) of polymerizing the aromatic vinyl monomer.

In the production process according to the present invention, a polar compound such as a Lewis base may be added upon the polymerization reaction as needed. Examples of the Lewis base include ethers such as tetrahydrofuran, diethyl ether, dioxane, ethylene glycol dimethyl ether, ethylene glycol dibutyl ether, diethylene glycol dimethyl ether and diethylene glycol dibutyl ether; tertiary amines such as tetramethylethylenediamine, trimethylamine, triethylamine, pyridine and quinuclidine; alkali metal alkoxides such as potassium t-amyloxide and potassium t-butoxide; and phosphines such as triphenylphosphine. These Lewis bases may be used either singly or in any combination thereof and are suitably selected within limits not impeding the objects of the present invention.

The polymerization reaction may be either an isothermal reaction or an adiabatic reaction and is generally conducted at a polymerization temperature ranging from 0 to 150° C., preferably from 20 to 120° C. After completion of the polymerization reaction, a polymer formed can be collected by a method known per se in the art, for example, by adding an alcohol such as methanol or isopropanol as a terminator to terminate the polymerization reaction, adding an antioxidant (stabilizer) and a crumbing agent to remove the solvent by a method such as direct drying or steam stripping and then drying the residue.

Resin Composition

The resin-modifying agent according to the present invention comprises the above-described aromatic vinyl-conjugated diene block copolymer as an active ingredient and is particularly useful as an impact modifier (toughening agent).

The resin composition according to the present invention is a composition comprising a resin component and a rubber component, wherein the rubber component contains the above-described aromatic vinyl-conjugated diene block copolymer.

Specific examples of the resin component to be modified include thermosetting resins such as epoxy resins, xylene resins, guanamine resins, diallyl phthalate resins, phenol resins, unsaturated polyester resins, polyimide, polyurethane, maleic acid resins, melamine resins and urea resins; aromatic vinyl type thermoplastic resins such as acrylonitrile-acrylate-styrene resins, acrylonitrile-ethylene-styrene resins, acrylonitrile-styrene resins, acrylonitrile-butadiene-styrene resins, polystyrene resins, high-impact polystyrene resins and methyl methacrylate-styrene resins; olefinic thermoplastic resins such as polyethylene and polypropylene; and engineering plastics such as poly (phenylene ether), polyamide, polycarbonate, polyacetal and polyester. Of these, the aromatic vinyl type thermoplastic resins, unsaturated polyester resins and poly(phenylene ether) are preferred, with the aromatic vinyl type thermoplastic resins being particularly preferred. These resins may be used either singly or in any combination thereof.

As the rubber component, may be used the aromatic vinyl-conjugated diene block copolymer according to the present invention alone. However, a mixture of the aromatic vinyl-conjugated diene block copolymer according to the present invention and another rubber may be used. The proportion of the aromatic vinyl-conjugated diene block copolymer according to the present invention in the rubber component is suitably selected as necessary for the end application intended. However, it is generally at least :30 wt. %, preferably at least 50 wt. %, more preferably at least 70 wt. %. If the content of the aromatic vinyl-conjugated diene block copolymer according to the present invention in the rubber component is too low, the balance between impact resistance and transparency of the resulting resin composition becomes bad. It is hence not preferable to use such a rubber component.

No particular limitation is imposed on another rubber, and any other rubber component routinely used as a toughening agent for resins may be added. Specific examples thereof include other aromatic vinyl-conjugated diene block copolymers than the aromatic vinyl-conjugated diene block copolymers according to the present invention, low-cis-polybutadiene rubber, high-cis-polybutadiene rubber, styrene-butadiene random copolymer rubber, polyisoprene rubber and natural rubber.

A proportion of the above rubber component to the resin component is suitably selected according to the end application intended and the kind and content of the aromatic vinyl-conjugated diene block copolymer. However, it is generally within a range of from 0.1 to 30 parts by weight, preferably from 1 to 20 parts by weight, more preferably from 3 to 15 parts by weight per 100 parts by weight of the resin component. It is preferable that the proportion of the rubber component should fall within this range, since a resin composition well balanced between impact resistance and transparency can be provided.

No particular limitation is imposed on a preparation process of the resin composition according to the present invention. For example, the preparation may be conducted by mechanically mixing the resin component with the rubber component at least containing the above-described aromatic vinyl-conjugated diene block copolymer. When the resin component is an aromatic vinyl type thermoplastic resin, a process in which an aromatic vinyl monomer or a mixture of the aromatic vinyl monomer and another monomer copolymerizable therewith is radical-polymerized in the presence of the rubber component containing the aromatic vinyl-conjugated diene block copolymer is preferred.

Examples of the aromatic vinyl monomer include styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromo-styrene and vinylnaphthalene. Of these, styrene is preferred. These aromatic vinyl monomers may be used either singly or in any combination thereof.

Examples of another monomer copolymerizable with the aromatic vinyl monomer include unsaturated nitrile monomers such as acrylonitrile, methacrylonitrile, α-chloroacrylonitrile; (meth)acrylic ester monomers such as methyl methacrylate and methyl acrylate; unsaturated fatty acid monomers such as acrylic acid, methacrylic acid and maleic anhydride; and phenylmaleimide. Of these, the unsaturated nitrile monomers, (meth)acrylic ester monomers and unsaturated fatty acid monomers are preferred, with the unsaturated nitrile monomers being particularly preferred. These other monomers copolymerizable with the aromatic vinyl monomer may be used either singly or in any combination thereof.

A proportion of the aromatic vinyl monomer to another monomer copolymerizable with the aromatic vinyl monomer to be used is suitably selected as necessary for the end application intended, However, it is generally within a range of from 20:80 to 100:0, preferably from 40:60 to 100:0, more preferably from 60:40 to 100:0 in terms of a weight ratio of [aromatic vinyl monomer]:[another monomer].

An amount of the rubber component used may be suitably selected as necessary for the end application intended. However, it is controlled to generally 0.1 to 30 parts by weight, preferably 1 to 20 parts by weight, more preferably 3 to 15 parts by weight per 100 parts by weight of the monomer(s) forming the resin component. It is preferable that the amount of the rubber component should fall within this range, since a resin composition well balanced between impact resistance and transparency can be provided.

No particular limitation is imposed on the radical polymerization process. Examples thereof include a bulk polymerization process, a solution polymerization process, a suspension polymerization process and multi-stage polymerization processes such as a bulk-suspension two-stage polymerization process. Of these, the bulk polymerization process and bulk-suspension two-stage polymerization process are particularly preferred. The bulk polymerization process is preferably a continuous bulk polymerization process.

When the resin composition according to the present invention is prepared by the continuous bulk polymerization process, the composition is prepared, for example, in accordance with the following process. The aromatic vinyl-conjugated diene block copolymer is dissolved in the aromatic vinyl monomer or a mixture of the aromatic vinyl monomer and another monomer copolymerizable therewith, and a diluent solvent, an internal lubricant such as liquid paraffin or mineral oil, an antioxidant, a chain transfer agent and the like are added to -the solution as needed. Thereafter, in the case of non-catalytic polymerization, polymerization is conducted under heat, generally, at 80 to 200° C., while polymerization is conducted in the presence of a catalyst, generally, at 20 to 200° C. in the case of catalytic polymerization. The polymerization is continued until the conversion of the monomer(s) (the aromatic vinyl monomer or the mixture of the aromatic vinyl monomer and another monomer copolymerizable therewith) into a polymer reaches 60% to 90%. In this case, it is preferable to use the polymerization catalyst.

In general, an organic peroxide or azo catalyst is used as the polymerization catalyst. The organic peroxide is preferred. Examples of the organic peroxide include peroxyketals such as 1,1-bis(t-butylperoxy)-cyclohexane and 1,1-bis (t-butylperoxy)-3,3,5-trimethyl-cyclohexane; dialkyl peroxides such as di-t-butyl peroxide and 2,5-dimethyl-2,5-di(t-butylperoxy)hexane; diacyl peroxides such as benzoyl peroxide and m-toluoyl peroxide; peroxycarbonates such as dimethylstyryl peroxydicarbonate; peroxy esters such as t-butyl peroxyisopropyl carbonate; ketone peroxides such as cyclohexanone peroxide; and hydroperoxides such as p-mentha hydroperoxide. These polymerization catalysts may be used either singly or in any combination thereof. A proportion of the polymerization catalyst used is generally 0.001 to 5 parts by weight, preferably 0.005 to 3 parts by weight, more preferably 0.01 to 1 part by weight per 100 parts by weight of the monomer(s).

Examples of the diluent solvent include aromatic hydrocarbons such as benzene, toluene, xylene and ethylbenzene; alicyclic hydrocarbons such as cyclohexane, methylcyclohexane and cyclopentane; aliphatic hydrocarbons such as n-butane, n-hexane and n-heptane; and ketones such as methyl isopropyl ketone. Of these, the aromatic hydrocarbons are preferred. These diluent solvents may be used either singly or in any combination thereof. A proportion of the solvent used is generally 0 to 25 wt. % based on the total weight of the monomer(s) used.

Examples of the chain transfer agent include a dimer of a-methylstyrene; mercaptans such as n-dodecyl mercaptan and t-dodecyl mercaptan; terpenes such as 1-phenylbutene-2-fluorene and dipentene; and halogen compounds such as chloroform.

After completion of the polymerization process, the resin composition formed can be collected in accordance with a method known per se in the art, for example, by removing unreacted monomers and the diluent solvent by solvent removal by heating under reduced pressure, or extrusion by means of an extruder designed so as to remove volatile matter. The thus-obtained resin composition is optionally pelletized or powdered to put to practical use.

In the case of the bulk-suspension polymerization process, in general, polymerization is partially conducted in the same manner as in the bulk polymerization process until the conversion of the monomer(s) into a polymer reaches 30% to 50%, and a polymerization mixture containing the partially polymerized polymer thus obtained is then suspended in water in the presence of a suspension stabilizer such as polyvinyl alcohol or carboxymethyl cellulose and/or a surfactant such as sodium dodecylbenzenesulfonate to complete the reaction. The high-impact resin composition thus formed is isolated by a method such as separation by filtration or centrifugation, washed with water and dried, and moreover pelletized or powdered as needed.

In the resin composition according to the present invention, no particular limitation is imposed on the average particle size of the rubber component containing the aromatic vinyl-conjugated diene block copolymer in a matrix of the resin component. However, it is preferable that the particle size should be generally within a range of from 0.01 to 10 µm, preferably from 0.1 to 5 µm, more preferably from 0.5 to 3 µm, since the impact resistance-enhancing effect becomes marked.

To the resin composition according to the present invention, compounding ingredients routinely used in resin industry may be added as needed. Specific examples of compounding ingredients usable in the resin composition include mineral oil, liquid paraffin, organic polysiloxane, organic or inorganic fillers, stabilizers, plasticizers, lubricants, ultraviolet absorbents, colorants, parting agents, antistatic agents and flame retardants.

The organic or inorganic fillers include various kinds of powdery or fibrous fillers, and specific examples thereof include silica, diatomaceous earth, alumina, titanium oxide, magnesium oxide, pumice powder, pumice balloon, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide fiber, polyethylene fiber, polypropylene fiber, polyester fiber and polyamide fiber.

Examples of the stabilizers include phenolic antioxidants such as octadecyl-3-(3,5-di-t-butyl-4-hydroxyphenyl) propionate, tetrakis[methylene-3(3,5-di-t-butyl-4-hydroxyphenyl)propionate]methane, alkyl β-(3,5-di-t-butyl-4-hydroxyphenyl)propionates and 2,2'-oxamidobis[ethyl-3(3,5-di-t-butyl-4-hydroxyphenyl)propionate]; and phosphoric stabilizers such as trisnonylphenyl phosphate, tris(2,4-di-t-butylphenyl)phosphate and tris(2,4-di-t-butylphenyl) phosphite.

No particular limitation is imposed on the flame retardants, and halogen-containing flame retardants are generally used. Various kinds of chlorine- or bromine-containing flame retardants may be used as the halogen-containing flame retardants. However, the bromine-containing flame retardants are preferred from the viewpoints of flameproofing effect, heat resistance upon forming or molding, dispersibility in the resin and influence on the physical properties of the resin. Examples of the bromine-containing flame retardants include hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and derivatives thereof [for example, tetrabromobisphenol A-bis (hydroxyethyl ether), tetrabromobisphenol A-bis(2,3-dibromopropyl ether), tetrabromobisphenol A-bis (bromoethyl ether), tetrabromobisphenol A-bis(allyl ether), etc.], tetrabromobisphenol S and derivative thereof [for example, tetrabromobisphenol S-bis(hydroxyethyl ether), tetrabromobisphenol S-bis(2,3-dibromopropyl ether), etc.], tetrabromophthalic anhydride and derivatives thereof [for example, tetrabromo-phthalimide, ethylenebistetrabromophthalimide, etc.], ethylenebis(5,6-dibromonorbornene-2,3-dicarboxyimide), tris-(2,3-dibromopropyl-1) isocyanurate, adducts of hexabromocyclopentadiene by Diels-Alder reaction, tribromophenyl glycidyl ether, tribromophenyl acrylate, ethylenebistribromophenyl ether, ethylenebispentabromophenyl ether, tetradecabromodiphenoxybenzene, brominated polystyrene, brominated polyphenylene oxide, brominated epoxy resins, brominated polycarbonate, polypentabromobenzyl acrylate, octabromonaphthalene, hexabromocyclododecane, bis (tribromophenyl)fumaramide and N-methylhexabromodiphenylamine.

In order to more effectively exhibit the flameproofing effect of the flame retardant, for example, an antimonial flame retardant auxiliary such as antimony trioxide, antimony pentoxide, sodium antimonate or antimony trichloride may be used as a flame retardant auxiliary.

These other compounding ingredients may be used either singly or in any combination thereof. The used amount thereof may be suitably selected within limits not impeding the objects of the present invention. These compounding ingredients may be mechanically mixed either with the resin component and the rubber component, or with the resin composition obtained by radical-polymerizing the aromatic vinyl monomer or the mixture of the aromatic vinyl monomer and another monomer copolymerizable with the aromatic vinyl monomer in the presence of the rubber component containing the aromatic vinyl-conjugated diene block copolymer. The mechanical mixing may be conducted by means of any of various kinds of kneading machines such as a single- or twin-screw extruder, a Banbury mixer, rolls and a kneader in accordance with a method known per se in the art. The mixing temperature is generally within a range of from 100 to 250° C.

ADVANTAGES OF THE INVENTION

According to the present invention, there are provided aromatic vinyl-conjugated diene block copolymers which have excellent bale-forming property and can provide a resin composition having excellent impact resistance without impairing the transparency of its resin component when used as an elastic polymer component for high-impact resin, and a production process thereof. According to the present invention, there are also provided resin-modifying agents comprising the aromatic vinyl-conjugated diene block copolymer as an active ingredient, resin composition comprising such a modifying agent, and a preparation process of the resin compositions. The aromatic vinyl-conjugated diene block copolymers according to the present invention are particularly useful as elastic polymer components (impact modifiers) for high-impact poly(aromatic vinyl) resins.

EMBODIMENTS OF THE INVENTION

The present invention will hereinafter be described more specifically by the following Preparation Examples, Examples and Comparative Examples. All designations of "part" or "parts" and "%" as will be used in the following examples mean part or parts by weight and wt. % unless expressly noted. Various properties of polymers were determined in accordance with the following respective methods:

(1) The content of the bound aromatic vinyl unit in a block copolymer sample was determined by measuring an intensity at a peak of infrared absorption with a phenyl group at a wave number of about 700 $cm^{-1}$ and comparing the intensity with a calibration curve obtained in advance.

(2) The peak top molecular weight (Mp) of a block copolymer sample was expressed by a value measured in terms of polystyrene by gel permeation chromatography (GPC) making use of tetrahydrofuran (THF) as a solvent.

(3) The content of the block aromatic vinyl segment (A) in an aromatic vinyl-conjugated diene block copolymer sample was determined in accordance with the decomposition method with osmic acid described in L. M. Kolthoff et al., J. Polym. Sci., 1, 429 (1948). More specifically, 0.05 g of the block copolymer were dissolved in 10 ml of carbon tetrachloride. To the solution, were added 16 ml of a 70% aqueous solution of tert-butyl hydroperoxide and 4 ml of a 0.05% chloroform solution of osmium tetrachloride. The resultant mixture was heated under reflex for 15 minutes in a bath heated to 90° C. to conduct an oxidative decomposition reaction. After completion of the reaction, the resultant reaction mixture was cooled, and 200 ml of methanol were added to the reaction mixture under stirring to precipitate a block aromatic vinyl component. The precipitated block aromatic vinyl component was then separated by filtration through a glass filter having an average pore size of 5 μm. The weight of the thus-obtained product was measured, and the segment content was expressed as a percentage to the total content of the bound aromatic vinyl unit in the aromatic vinyl-conjugated diene block copolymer.

(4) The peak top molecular weight (A-Mp) of the block aromatic vinyl segment (A) was determined by dissolving the block aromatic vinyl component separated in the method (3) in THF and expressed by a value measured in terms of polystyrene by GPC.

(5) The proportion of block aromatic vinyl segment portions having a molecular weight at most a third of a peak top molecular weight (A-Mp) in a molecular weight distribution curve of the block aromatic vinyl segment (A) was calculated out in accordance with the method for finding an area proportion of a retention volume (hereinafter abbreviated as "$V_R$") unit, which is described in Japanese Patent Application Laid-Open No. 74209/1989, and expressed by mol %. More specifically, in the case of the present invention, a weight proportion (Wl) per 5.835 μl of $V_R$ was calculated to determine a molecular weight (M1) in each $V_R$ from a correlation curve (calibration curve). From this value, a ratio (W1/M1) of the number of moles in each $V_R$ was determined, and a proportion of the number of moles in each $V_R$ was found from (W1/M1)/Σ(W1/M1). From this data, the proportion of portions having a molecular weight at most a third of the peak top molecular weight was calculated.

(6) Izod impact strength was determined in accordance with JIS K 7110 and expressed by an index (the greater the numerical value, the better the Izod impact strength) assuming that the value of a comparative example was 100.

(7) The transparency is determined by measuring a transmittance of a sample in accordance with JIS K 7105, and was expressed by an index (the greater the numerical value, the better the transparency) assuming that the value of a comparative example was 100.

(8) The bale-forming property of a block copolymer sample was evaluated by compression-molding the block copolymer using a mold for compression molding in the form of 20 cm×10 cm×5 cm under conditions of clamping pressure: 160 $kg/cm^2$, clamping time: 30 seconds, compression temperature: 60° C., and amount of sample used: 1,500 g, and ranked by the surface condition of the resultant pressed product in accordance with the following standard:

◎: Extremely firmly molded, and not taken in rubber pieces even when rubbing the surface thereof with fingers;

○: Firmly molded, but slightly shaved in the form of rubber powder when rubbing the surface thereof with fingers;

Δ: Molded, but easily got out of shape when disintegrating it with fingers;

X: Not molded.

Example 1
(Preparation example of a block copolymer)

After a 2-kiloliter reactor equipped with a stirrer, reflux condenser and jacket was washed, dried and purged with nitrogen, 700 kg of cyclohexane purified and dried in advance, and 40 kg of butadiene were charged into the reactor. After the mixture was heated to 50° C., 390 ml of a hexane solution (1.65 mmol/ml) of n-butyllithium were added to start polymerization (first stage of polymerization). At the time a conversion of the monomer in the reaction reached about 100%, a mixture of 20 kg of butadiene and 21 kg of styrene was added to polymerize them (second stage of polymerization). At the time a conversion of the monomer mixture in the reaction reached about 100%, 19 kg of styrene were further added to continue the polymerization (third stage of polymerization). At the time a conversion of the monomer in the third-stage reaction reached about 100%, 10 mmol of isopropyl alcohol were added to terminate the polymerization, and 200 g of a phenolic antioxidant (Irganox 1076, trade name, product of CIBA-GEIGY AG) were then added. Thereafter, the solvent was removed by steam stripping, and the residue was dried under reduced pressure to obtain Block Copolymer A.

With respect to the thus-obtained Block Copolymer A, the content of the bound aromatic vinyl unit, the peak top molecular weight (Mp) of the block copolymer, the content of the block aromatic vinyl segment (A), the peak top molecular weight (A-Mp) in the molecular weight distribution curve of the block aromatic vinyl segment (A), the proportion of block aromatic vinyl segment portions having a molecular weight at most a third of the peak top molecular weight (A-Mp) in the molecular weight distribution curve of the block aromatic vinyl segment (A), and bale-forming property were determined or evaluated. The results thereof are shown in Table 1.

Examples 2 to 5

Block Copolymers B to E were produced in accordance with the same process as in Example 1 except that the polymerization conditions were respectively changed to those shown in Table 1, and the copolymers were evaluated in the same manner as in Example 1. The results thereof are shown in Table 1.

Comparative Example 1

After a 2-kiloliter reactor equipped with a stirrer, reflux condenser and jacket was washed, dried and purged with nitrogen, 700 kg of cyclohexane purified and dried in advance, 15 mmol of tetramethylethylenediamine (TMEDA), 61 kg of butadiene and 19 kg of styrene were charged into the reactor. After the mixture was heated to 50° C., 390 ml of a hexane solution (1.65 mmol/ml) of n-butyllithium were added to start polymerization (first stage of polymerization). At the time a conversion of the monomers in the reaction reached about 100%, 20 kg of styrene were further added to conduct polymerization until a conversion of the monomer in the reaction reached about 100%. Thereafter, 10 mmol of isopropyl alcohol were added to terminate the polymerization, and 200 g of a phenolic antioxidant (Irganox 1076, trade name, product of CIBA-GEIGY AG) were then added. The solvent was then removed by steam stripping, and the residue was dried under reduced pressure to obtain Block Copolymer F. With respect to the thus-obtained Block Copolymer F, the content of the bound aromatic vinyl unit, the peak top molecular weight (Mp) of the block copolymer, the content of the block aromatic vinyl segment (A), the peak top molecular weight (A-Mp) in the molecular weight distribution curve of the block aromatic vinyl segment (A), the proportion of block aromatic vinyl segment portions having a molecular weight at most a third of the peak top molecular weight (A-Mp) in the molecular weight distribution curve of the block aromatic vinyl segment (A), and bale-forming property were determined or evaluated. The results thereof are shown in Table 1.

Comparative Examples 2 to 4

Block Copolymers G to I were produced in accordance with the same process as in Comparative Example 1 except that the polymerization conditions were respectively changed to those shown in Table 1, and the copolymers were evaluated in the same manner as in Comparative Example 1. The results thereof are shown in Table 1.

TABLE 1

|  | Example | | | | | Compartive Example | | | |
| --- | --- | --- | --- | --- | --- | --- | --- | --- | --- |
|  | 1 | 2 | 3 | 4 | 5 | 1 | 2 | 3 | 4 |
| Polymer code | A | B | C | D | E | F | G | H | I |
| Amount of cyclohexane (kg) | 700 | 700 | 700 | 700 | 700 | 700 | 700 | 700 | 700 |
| Amount of n-butyllithium added (ml) | 390 | 400 | 330 | 310 | 300 | 390 | 390 | 390 | 330 |
| Amount of polar compound(*1) added (mmol) | — | — | — | — | — | 15 | — | 8 | 25 |
| First stage of polymerization |  |  |  |  |  |  |  |  |  |
| Butadiene (kg) | 40 | 44 | 50 | 45 | 46 | 61 | 61 | 65 | 80 |
| Styrene (kg) | — | — | — | — | — | 19 | — | 10 | 8 |
| Second stage of polymerization |  |  |  |  |  |  |  |  |  |
| Butadiene (kg) | 20 | 16 | 20 | 15 | 14 | — | — | — | — |
| Styrene (kg) | 21 | 18 | 20 | 19 | 16 | 20 | 39 | 25 | — |
| Third stage of polymerization |  |  |  |  |  |  |  |  |  |
| Styrene (kg) | 19 | 22 | 10 | 21 | 24 | — | — | — | — |
| Bound styrene content (wt. %) | 40 | 40 | 30 | 40 | 40 | 39 | 39 | 35 | 20 |
| Block styrene content (%) | 70 | 90 | 79 | 90 | 70 | 74 | 100 | 80 | 77 |
| Vinyl bond content in butadiene segment (%) | 8 | 9 | 9 | 10 | 19 | 20 | 9 | 13 | 29 |
| Peak top molecular weight (A-Mp) of block styrene segment | 85,000 | 100,000 | 97,000 | 115,000 | 88,000 | 75,000 | 97,000 | 64,000 | 40,000 |
| Proportion of portions having a molecular weight at most ⅓ of peak top molecular weight (A-Mp) of block styrene segment (mol %) | 55 | 58 | 60 | 58 | 56 | 47 | 18 | 32 | 58 |
| Peak top molecular weight (Mp) of block copolymer | 390,000 | 400,000 | 450,000 | 540,000 | 540,000 | 370,000 | 390,000 | 380,000 | 460,000 |

(*1) Tetramethylethylenediamine (TMEDA).

Example 6

After 180 g of Block Copolymer A obtained in Example 1 were dissolved in 1,820 g of a styrene monomer in a stainless steel-made reactor equipped with a stirring machine, a chain transfer agent (n-dodecyl mercaptan) was added in a proportion of 250 ppm based on the styrene monomer. The resultant mixture was stirred at 130° C. for 1 hour and 20 minutes to conduct bulk polymerization. The contents were then taken out of the reactor. 1,250 g of the contents and 3,750 g of a 2% aqueous solution of polyvinyl alcohol were charged into a 8-liter stainless steel-made reactor equipped with a stirring machine, and the resultant mixture was heated to 70° C. Then, 2.5 g of benzoyl peroxide and 1.26 g of dicumyl peroxide were added to conduct suspension polymerization for 1 hour at 70° C., for 1 hour at 90° C., for 1 hour at 110° C. and for 4 hours at 130° C. After completion of the polymerization, the reaction mixture was cooled down to room temperature, and the resultant polystyrene resin composition was collected by filtration, washed with water and then dried under reduced pressure at 60° C. for 6 hours.

The polystyrene resin composition thus obtained was kneaded by rolls heated to 180° C. and formed into a sheet. The sheet was cut into pellets by means of a pelletizer for sheets. The thus-obtained pellets were injection-molded by means of an injection molding machine, SAV-30/30 (manufactured by Yamashiro Seiki-sha K.K.; mold temperature: 50° C.; nozzle tip temperature: 240° C.) to produce a test specimen, thereby evaluating the resin composition as to Izod impact strength and transparency. The results thereof are shown in Table 2.

Examples 7 to 10, and Comparative Examples 5 to 8

The experiment was conducted in the same manner as in Example 6 except that the Block Copolymers B to I produced in Examples 2 to 5, and Comparative Examples 1 to 4 were respectively used, thereby evaluating the resultant resin compositions as to Izod impact strength and transparency in the same manner as in Example 6. The results thereof are shown in Table 2.

TABLE 2

|  | Example | | | | | Comparative Example | | | |
| --- | --- | --- | --- | --- | --- | --- | --- | --- | --- |
|  | 6 | 7 | 8 | 9 | 10 | 5 | 6 | 7 | 8 |
| Kind of polymer | A | B | C | D | E | F | G | H | I |
| Proportion (wt. %) | 10 | 10 | 10 | 10 | 10 | 10 | 10 | 10 | 10 |
| Bale-forming property | ⊚ | ⊚ | ⊚ | ⊚ | ⊚ | Δ | X | X | ⊚ |
| Izod impact strength(*1) | 104 | 102 | 110 | 114 | 102 | 100 | 99 | 109 | 157 |
| Transparency(*2) | 108 | 113 | 112 | 117 | 110 | 100 | 113 | 92 | 83 |

(*1), (*2): Each expressed by an index assuming that the value of Comparative Example 5 was 100.

What is claimed is:

1. An aromatic vinyl-conjugated diene block copolymer composed of a bound aromatic vinyl unit and a bound conjugated diene unit and containing at least a block aromatic vinyl segment, wherein:
   (1) a content of the bound aromatic vinyl unit in the block copolymer is 5 to 60 wt. %;
   (2) a molecular weight (A-Mp) corresponding to a peak in a molecular weight distribution curve of the block aromatic vinyl segment (A) as determined by gel permeation chromatography (GPC) is 80,000 to 300,000;
   (3) a proportion of block aromatic vinyl segment portions having a molecular weight at most a third of the molecular weight (A-Mp) corresponding to the peak in the molecular weight distribution curve of the block aromatic vinyl segment (A) as determined by GPC is 55 to 70 mol % based on the total content of the block aromatic vinyl segment (A); and
   (4) a molecular weight (Mp) corresponding to a peak in a molecular weight distribution curve of the block copolymer as determined by GPC is 100,000 to 600,000.

2. The aromatic vinyl-conjugated diene block copolymer according to claim 1, wherein the content of the bound aromatic vinyl unit in the block copolymer is 25 to 50 wt. %.

3. The aromatic vinyl-conjugated diene block copolymer according to claim 1, wherein a proportion of the block aromatic vinyl segment (A) is 40 to 95 wt. % based on the total content of the bound aromatic vinyl unit.

4. The aromatic vinyl-conjugated diene block copolymer according to claim 1, wherein the molecular weight (A-Mp) corresponding to the peak in the molecular weight distribution curve of the block aromatic vinyl segment (A) as determined by GPC is 80,000 to 200,000.

5. The aromatic vinyl-conjugated diene block copolymer according to claim 1, wherein the vinyl bond content in the conjugated diene segment is at most 30% in terms of the total content of 1,2-vinyl bond and 3,4-vinyl bond.

6. A process for producing an aromatic vinyl-conjugated diene block copolymer by copolymerizing an aromatic vinyl monomer and a conjugated diene monomer using an active organometallic compound as an initiator in a hydrocarbon solvent, which comprises copolymerizing 5 to 60 wt. % of the aromatic vinyl monomer with 40 to 95 wt. % of the conjugated diene monomer in the following steps:
   (i) polymerizing the conjugated diene monomer;
   (ii) after step (i), polymerizing a mixture composed of the aromatic vinyl monomer and the conjugated diene monomer; and
   (iii) after step (ii), polymerizing the aromatic vinyl monomer;
   and further wherein a proportion of the aromatic vinyl monomer in the mixture in step (ii) to the aromatic vinyl monomer in step (iii) falls within a range of from 30:70 to 70:30.

7. The production process according to claim 6, wherein a proportion of the aromatic vinyl monomer to the conjugated diene monomer in the mixture in step (ii) falls within a range of from 10:90 to 90:10 in terms of a weight ratio.

8. The production process according to claim 6, wherein a proportion of the monomer mixture in step (ii) to all the monomers used in the process falls within a range of from 10 to 90 wt. %.

9. The production process according to claim 6, wherein a proportion of the conjugated diene in step (i) to the mixture in step (ii) falls within a range of from 20:80 to 90:10.

10. A resin composition comprising a resin component and a rubber component, wherein the rubber component contains an aromatic vinyl-conjugated diene block copolymer which is composed of a bound aromatic vinyl unit and a bound conjugated diene unit and contains at least a block aromatic vinyl segment, said block copolymer having the following features:
   (1) a content of the bound aromatic vinyl unit in the block copolymer being 5 to 60 wt. %;
   (2) a molecular weight (A-Mp) corresponding to a peak in a molecular weight distribution curve of the block aromatic vinyl segment (A) as determined by gel permeation chromatography (GPC) being 80,000 to 300,000;

(3) a proportion of block aromatic vinyl segment portions having a molecular weight at most a third of the molecular weight (A-Mp) corresponding to the peak in the molecular weight distribution curve of the block aromatic vinyl segment (A) as determined by GPC being 55 to 70 mol % based on the total content of the block aromatic vinyl segment (A); and (4) a molecular weight (Mp) corresponding to a peak in a molecular weight distribution curve of the block copolymer as determined by GPC being 100,000 to 600,000.

11. The resin composition according to claim 10, wherein the resin component is an aromatic vinyl thermoplastic resin.

12. The resin composition according to claim 10, wherein the rubber component is contained in a proportion of 0.1 to 30 parts by weight per 100 parts by weight of the resin component.

13. A process for preparing a resin composition by radical-polymerizing an aromatic vinyl monomer or a mixture of the aromatic vinyl monomer and another monomer copolymerizable with the aromatic vinyl monomer in the presence of a rubber component, which comprises using, as the rubber component, a rubber component containing an aromatic vinyl-conjugated diene block copolymer which is composed of a bound aromatic vinyl unit and a bound conjugated diene unit and contains at least a block aromatic vinyl segment, said block copolymer having the following features:

(1) a content of the bound aromatic vinyl unit in the block copolymer is being 5 to 60 wt. %;

(2) a molecular weight (A-Mp) corresponding to a peak in a molecular weight distribution curve of the block aromatic vinyl segment (A) as determined by gel permeation chromatography (GPC) being 80,000 to 300,000;

(3) a proportion of block aromatic vinyl segment portions having a molecular weight at most a third of the molecular weight (A-Mp) corresponding to the peak in the molecular weight distribution curve of the block aromatic vinyl segment (A) as determined by GPC being 55 to 70 mol % based on the total content of the block aromatic vinyl segment (A); and (4) a molecular weight (Mp) corresponding to a peak in a molecular weight distribution curve of the block copolymer as determined by GPC being 100,000 to 600,000.

14. The preparation process according to claim 13, wherein 100 parts by weight of the aromatic vinyl monomer or the mixture of the aromatic vinyl monomer and another monomer copolymerizable with the aromatic vinyl monomer are radical-polymerized in the presence of 0.1 to 30 parts by weight of the rubber component.

15. The production process according to claim 6, wherein the conversion of monomer(s) in each step of the polymerization reaction is about 100%, followed by introduction of additional monomer(s) for the subsequent step.

16. The production process according to claim 6, wherein the block copolymer prepared is composed of a bound aromatic vinyl unit and a bound conjugated diene unit and contains at least a block aromatic vinyl segment, said block copolymer having the following features:

(1) a content of the bound aromatic vinyl unit in the block copolymer being 5 to 60 wt. %;

(2) a molecular weight (A-Mp) corresponding to a peak in a molecular weight distribution curve of the block aromatic vinyl segment (A) as determined by gel permeation chromatography (GPC) being 80,000 to 300,000;

(3) a proportion of block aromatic vinyl segment portions having a molecular weight at most a third of the molecular weight (A-Mp) corresponding to the peak in the molecular weight distribution curve of the block aromatic vinyl segment (A) as determined by GPC being 55 to 70 mol % based on the total content of the block aromatic vinyl segment (A); and (4) a molecular weight (Mp) corresponding to a peak in a molecular weight distribution curve of the block copolymer as determined by GPC being 100,000 to 600,000.

* * * * *